United States Patent

Tanaka et al.

Patent Number: 5,344,726
Date of Patent: Sep. 6, 1994

[54] CARBON ANODE FOR SECONDARY BATTERY

[75] Inventors: Hideaki Tanaka; Takehito Mitate; Hiroyuki Kitayama; Kuzuo Yamada, all of Nara, Japan

[73] Assignee: Sharp Kabushiki Kaisha, Osaka, Japan

[21] Appl. No.: 79,086

[22] Filed: Jun. 17, 1993

Related U.S. Application Data

[63] Continuation of Ser. No. 898,804, Jun. 12, 1992, abandoned.

[30] Foreign Application Priority Data

Jun. 17, 1991 [JP] Japan .................................. 3-144547

[51] Int. Cl.$^5$ ............................................. H01M 4/96
[52] U.S. Cl. ................................. 429/209; 429/218; 423/445 R
[58] Field of Search ............... 429/209, 218, 194, 197; 423/414, 445; 428/408; 427/122, 249; 252/502

[56] References Cited

U.S. PATENT DOCUMENTS

| | | | |
|---|---|---|---|
| 3,829,327 | 8/1974 | Omori et al. | 429/218 |
| 4,136,213 | 1/1979 | Fung et al. | 429/218 |
| 4,702,977 | 10/1987 | Hiratsuka et al. | 429/194 |
| 4,968,527 | 11/1990 | Yoshimoto et al. | 429/218 X |
| 4,980,250 | 12/1990 | Takahashi et al. | 429/194 |
| 5,030,529 | 7/1991 | Wada et al. | |

FOREIGN PATENT DOCUMENTS

| | | |
|---|---|---|
| 1903349 | 9/1971 | Fed. Rep. of Germany . |
| 63-24555 | 2/1988 | Japan . |
| 2277593 | 3/1990 | Japan . |
| 3245473 | 11/1991 | Japan . |
| WO-9013924 | 11/1990 | PCT Int'l Appl. . |

OTHER PUBLICATIONS

Patent Abstracts of Japan, vol. 16, No. 267 (Feb. 1992).

Primary Examiner—Anthony Skapars
Attorney, Agent, or Firm—David G. Conlin; George W. Neuner

[57] ABSTRACT

A carbon anode for a secondary battery in which a carbon active material of the carbon anode is covered with an amorphous carbon.

3 Claims, 2 Drawing Sheets ical Society, Vol. 117, No. 2, pp. 222, 1970).

CARBON ANODE FOR SECONDARY BATTERY

This is a continuation of copending application(s) Ser. No. 07/898,804 filed on Jun. 12, 1992, now abandoned.

BACKGROUND OF THE INVENTION

1. Field of the Invention

The present invention relates to a carbon anode for a secondary battery employing a carbon as an active material.

2. Description of the Related Art

Graphite forms an intercalation compound which has regularly stacking layer. By using this structure, graphite has been studied as an anode for a secondary battery. Then, it is found that in a case where it is used in an electrolyte, for example, a carbon material of low crystallinity such as a carbon material (disclosed in Japanese Opened Patent No. 24555/1988) which is obtained by pyrolytically decomposing a hydrocarbon in a vapor phase and has a turbostratic structure and peculiar orientation is preferably used.

However, in a case of the carbon material of low crystallinity, a potential of battery is largely varied as dopant is undoped. It is because capacity which can be used as a battery anode is reduced, and then it is difficult to produce a battery of high capacity.

In fact, it is found that the variation in the potential is smaller and capacity which can be used as the battery anode is increased in a carbon material of higher crystallinity among carbon materials.

However, as the crystallinity increases, it is supposed that charging efficiency is reduced because of decomposition of the electrolyte, and then the carbon structure (referring to J. Electrochem. Soc., 117, 222, (1970)). Such reduction of the charging efficiency is observed, for example, at a shoulder of potential curve in a case where the variation in potential vs. a charge amount divided by initial charging is plotted. The decomposition of the carbon structure is indicated by reduction of cyclic characteristics.

SUMMARY OF THE INVENTION

The present invention provides a carbon anode for a secondary battery in which a carbon active material of the carbon anode is covered with an amorphous particle.

Preferably, the amorphous carbon has a turbostratic structure. More preferably, an interlayer distance of the carbon having the turbostratic structure in the c-axis direction ranges 0.337 to 0.360 nm and a ratio of the peak value at 1360 cm$^{-1}$ to the peak value of 1580 cm$^{-1}$ in argon ion laser Raman spectra ranges from 0.4 to 1.0.

Thus, according to the present invention, a core of carbon is formed of a carbon material of higher crystallinity in order to provide an anode material of high capacity and high density, so as to be employed as the battery.

DETAILED DESCRIPTION OF THE PREFERRED EMBODIMENTS

Figure 1:
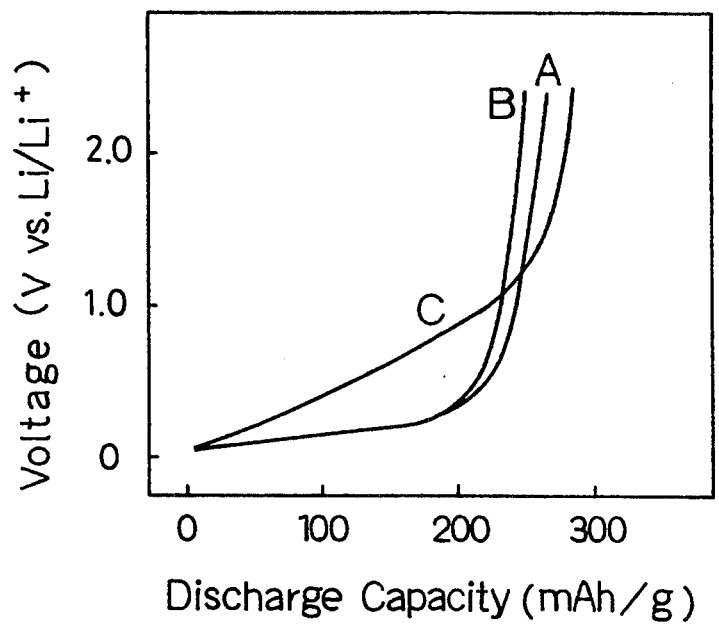
FIG. 1 is a view showing a discharge curve.

In the present invention, the carbon active material is covered with not different substance of carbon but carbon itself of low grade structure. The skin structure on the carbon surface shows amorphous like as extremely low crystallinity and small crystal size, and its orientation is rather in disorder. Thus, this carbon structure is called turbostratic structure. Otherwise a core structure of the carbon shows high crystallinity and comparatively large particle size.

An amorphous carbon is a carbon of low crystallinity, which includes laminate irregularities on a carbon surface, an extremely small crystallite formed of a carbon atom of sp$^2$ hybrid orbital, another carbon atom of except the sp$^2$ hybrid orbital and the like.

A carbon anode material for a secondary battery preferably has a turbostratic structure in which an amorphous carbon has a laminate irregularities on a carbon surface.

The carbon of the turbostratic has the following characteristics in an X-ray diffraction pattern.

1. A (001) diffraction pattern is broad and its position is shifted to a low angle as compared with graphite. Namely, an interlayer distance is larger, tailing to the low angle side and showing asymmetrical profile.
2. An (hk) diffraction is rather broad, sharply rising on the low angle side, long tailing to the high angle side and showing asymmetrical profile.
3. An (hkl) diffraction is not recognized.

It is preferable to employ the carbon material having the turbostratic structure as the carbon anode for the secondary battery, in which an interlayer distance in the c-axis ranges 0.337 to 0.360 nm and a ratio of the peak value at 1360 cm$^{-1}$ to the peak value at 1580 cm$^{-1}$ in argon ion laser Raman spectra ranges from 0.4 to 1.0. More preferably, the interlayer distance in the c-axis direction ranges 0.343 to 0.355 nm.

In addition, the above interlayer distance in the c-axis direction is found from a diffraction angle of a peak position of the (001) diffraction.

Since the carbon anode material for the secondary battery has the above structure, a carbon material of higher crystallinity can be employed. More specifically, it is possible to prevent reduction of charging efficiency and decomposition of a carbon structure, which is supposedly caused by decomposition of electrolyte in a case where the carbon material of high crystallinity is employed. It is preferable that the amorphous carbon covering the surface is as thin as possible and its core is formed of a carbon of high crystallinity. In addition, it is more preferable to employ a carbon material of high crystallinity, in which an interlayer distance in the c-axis direction ranges 0.335 to 0.340 nm and a peak ratio ranges under 0.4 in a ratio of the peak value at 1360 cm$^{-1}$ to the peak value of 1580 cm$^{-1}$ in argon ion laser Raman spectra ranges under 0.4. In addition, the interlayer distance in the c-axis direction is found from an diffraction angle at a peak position of the (001) diffraction.

Thus, the inventors of the present invention found that when even a carbon in which its core is formed of high crystallinity and charging efficiency is reduced by decomposition of electrolyte is covered with the amorphous particle and worked as an anode active material of the secondary battery, such reduction is not generated and decomposition does not occur.

The above effect can be more remarkable when the amorphous carbon has a turbostratic structure and it is further remarkable when the carbon in which an interlayer distance in the c-axis direction ranges 0.337 to 0.360 nm and a ratio of the peak value at 1360 cm$^{-1}$ to the peak value at 1580 cm$^{-1}$ in argon ion laser Raman spectra ranges from 0.4 to 1.0 is employed.

In addition, referring to the carbon material of high crystallinity in which an interlayer distance in the c-axis direction ranges 0.335 to 0.340 nm and a ratio of the peak value at 1360 cm$^{-1}$ to the peak value at 1580 cm$^{-1}$ in argon ion laser Raman spectra in 0.4 or less, the discharge curve shows plateau in which variation in potential caused by undoping of dopant hardly occurs and carbon material is formed as a stable anode at a low potential.

EXAMPLE

The present invention will be described in detail in reference to embodiments in which anode for a lithium secondary battery is employed.

Example 1

Figure 3:
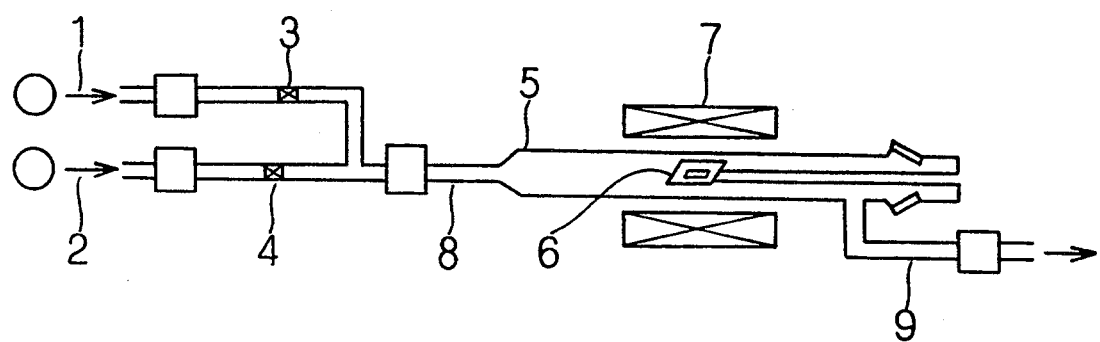
FIG. 3 is a view showing a reaction apparatus used in embodiments of the present invention.

A carbon material was formed in a reaction apparatus shown in FIG. 3. First, graphite (KS44 made by LONZA Ltd.) powder of 50 mg was placed, and then argon gas and propane gas were supplied from a argon supply line 1 and a propane supply line 2, respectively. Then, a propane concentration of raw gas was set to 10 mole % by handling needle valves 3 and 4. Flow velocity of the raw gas was set to 12.7 cm/min and an amount of supply of propane was set to 0.05 mol/h. In addition, a hydrocarbon or its derivatives other than propane may be used as a raw material. More specifically, an aliphatic hydrocarbon, an aromatic hydrocarbon, an alicyclic hydrocarbon or the like may be used. Further specifically, methane, ethane, butane, benzene, toluene, naphthalene, acetylene, biphenyl and substitution products thereof may be used. In a reaction tube 5 was a holder 6 formed of a quartz plate and a heating furnace 7 was provided around the reaction tube 5. The holder 6 and the graphite powder are heated by the furnace 7 at approximately 750° C., whereby propane supplied from a pyrex tube 8 was pyrolytically decomposed and then a pyrolysis carbon was deposited on the surface. Residual gas after pyrolysis was removed by an exhaust system and pyrolysis time was set to 2 hours. Thus, a carbon powder of 80 mg was provided. In addition, for reference, a carbon provided in the same condition as above through the pyrolysis time of 30 minutes was also taken out. Crystallinity of both were evaluated in X-ray diffraction and Raman scattering. Its results are shown in the following table 1.

TABLE 1

| Pyrolysis time | d(nm) | R | Remarks |
|---|---|---|---|
| 30 minutes | 0.336 | 0.18 | |
| 2 hours | 0.338 | 0.54 | Low angle side: Broad |

The carbon of 35.1 mg obtained through 2-hour pyrolysis time was mixed with a polyolefin binder of 5 wt % and then they were hot pressed on a nickel mesh at 120° C. by 400 Kg/cm$^2$. Then, a pellet diameter was 15 mm and then an electrode A was made.

Example 2

A carbon is deposited on the same condition in the same apparatus as above using a nickel powder (200 mesh) as a substrate. The result of evaluation of the structure of the carbon thus obtained is shown in the following table 2. Crystallinity is high at the initial stage of deposition because of a nickel catalysis. On the surface there is no effect of catalyst and the surface is covered with an amorphous carbon having a turbostratic structure which is characteristic to a pyrolysis carbon.

| Pyrolysis time | d(nm) | R | Remarks |
|---|---|---|---|
| 30 minutes | 0.337 | 0.28 | |
| 2 hours | 0.338 | 0.49 | Low angle side: Broad |

An electrode B was produced through approximate 2-hour pyrolysis time in the same manner as that of the electrode A.

Although the thus electrodes produced are formed of a composite of carbon particles, in which its core is formed of high crystallinity and its skin is formed of amorphous particle, it is also available for a composite of carbon layers, in which an inner layer is made of high crystallinity carbon on a metal substrate and an outer layer is covered with thin amorphous carbon.

Variation 1

A carbon material was made in the same manner as that of the example 2 except that a quartz substrate was used as a substrate for deposition. Then, an electrode C was made in the same manner as that of the example 1. The result of evaluation of the carbon is shown in the following table 3. It is not found that the carbon has a turbostratic structure.

| Pyrolysis time | d(nm) | R | Remarks |
|---|---|---|---|
| 30 minutes | 0.346 | 0.74 | Broad |
| 2 hours | 0.346 | 0.75 | Broad |

A charging and discharging test was performed using propylene carbonate solution containing lithium perchlorate of 1 mol by using a three-electrode cells in which Li was a cathode and Li/Li$^+$ was a reference electrode. A discharge curve at fifth cycle at this time is shown in FIG. 1.

Thus, it is found that variation in potential in accordance with undoping of dopant is great and capacity used as a battery is small in a case of a carbon material of low crystallinity, while the variation in potential is small and the capacity used as the battery is great in a case of a carbon material of high crystallinity.

In addition, in a case where the graphite (KS44 made by LONZA Ltd.) is used as the electrode, charging in this system is almost impossible but charging efficiency at the initial stage is not reduced and the electrode is not decomposed in the electrode A.

Thus, it is found that a carbon material covered with an amorphous particle in surface, in which an active material on the carbon surface is in contact with an electrolyte, is used as an anode in a case where an organic electrolyte is used. More preferably, it is found that the carbon material has a turbostratic structure having irregularities on the carbon surface. In addition, it is preferable that an interlayer distance of the carbon material having the turbostratic structure in a c axis direction ranges 0.337 to 0.360 nm and a peak ratio thereof ranges 0.4 to 1.0 at a ratio of the peak value at 1360 cm$^{-1}$ to the peak value at 1580 cm$^{-1}$ ion laser Raman spectra ranges from 0.4 to 1.0. More preferably, the interlayer distance in the c axis direction ranges 0.343 to 0.355 nm. In addition, the interlayer distance in the c axis direction is found from a diffraction angle at a peak position of the broad (001) lattice diffraction. The above effect is confirmed through many experiments using lithium as dopant.

Figure 2:
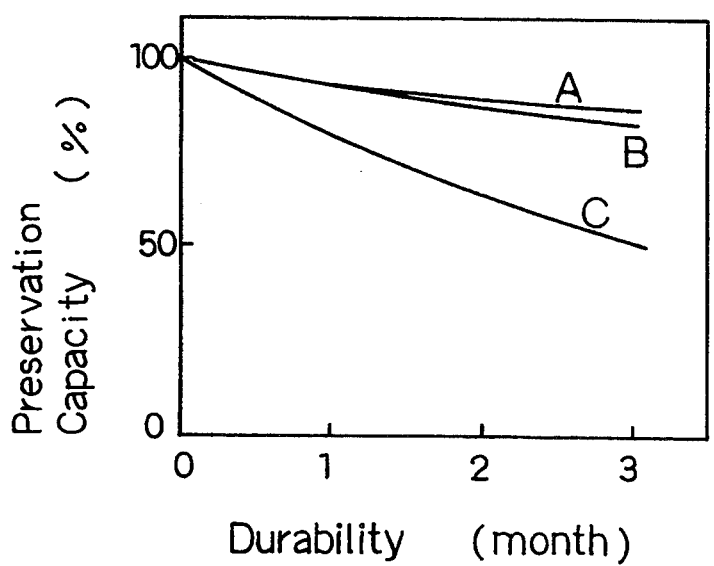
FIG. 2 is a view showing a preservation capacity.

Then, respective electrodes are charged with a constant current to 0V vs. Li/Li+ and then preserved for three months. Thereafter, each preserved capacity of the electrodes is measured and shown in FIG. 2. Then, it is found that each self-discharge in the electrodes A and B is small.

As can be seen from the above results, in a case of the electrode comprising the carbon material of high crystallinity in which an interlayer distance in the c axis direction ranges 0.335 to 0.340 nm and a ratio of the peak value at 1360 $cm^{-1}$ to the peak value at 1580 $cm^{-1}$ in argon ion laser Raman spectra is 0.4 or less, since discharge curve shows many plateau in which there is almost no variation in potential caused by undoping of dopant, the electrode shows a stable anode at a low potential and its self-discharging is small.

In addition, the carbon material in accordance with the present invention can be made by a method in which graphite particles are soaked into liquid such as tar or pitch and then fired.

As described above, according to the present invention, a solvent is prevented from decomposing on an electrode surface, a carbon structure is prevented from being decomposed and the carbon material of high a crystallinity can be used, whereby charging and discharging capacity can be increased at a low potential. As a result, there can be provided an anode for a lithium secondary battery which is superior in cyclic characteristics.

While only certain presently preferred embodiments have been described in detail, as will be apparent with those skilled in the art, certain changes and modifications can be made without departing from the scope of the invention as defined by the following claims.

What is claimed is:

1. A carbon anode for a secondary battery comprising a core of highly crystalline carbon covered with a layer of amorphous carbon:

in which the highly crystalline carbon has an interlayer distance in the c-axis direction of from 0.335 to 0.340 nm and a ratio of the peak value at 1360 $cm^{-1}$ to the peak value at 1580 $cm^{-1}$ in argon ion laser Raman spectra is less than 0.4.

2. A carbon anode for a secondary battery according to claim 1, wherein the secondary battery is lithium secondary battery.

3. A carbon anode for a secondary battery according to claim 1, in which the amorphous carbon has a turbostratic structure and the turbostratic structure has an interlayer distance in the c-axis direction of from 0.343 to 0.355 nm.

* * * * *